（12）United States Patent
Shingaki

(10) Patent No.: US 6,327,824 B1
(45) Date of Patent: Dec. 11, 2001

(54) TERMITE SHIELDING STRUCTURE OF UNDERGROUND BEAMS AND A METHOD FOR CONSTRUCTING THE SAME

(75) Inventor: Morinobu Shingaki, Okinawa (JP)

(73) Assignee: Shinyo Co., Ltd., Okinawa (JP)

( * ) Notice: Subject to any disclaimer, the term of this patent is extended or adjusted under 35 U.S.C. 154(b) by 0 days.

(21) Appl. No.: 09/410,057

(22) Filed: Oct. 1, 1999

(51) Int. Cl.[7] ................. E04B 1/72; E04H 9/16
(52) U.S. Cl. ............................ 52/101; 52/169.5
(58) Field of Search ....................... 52/101, 169.5, 52/169.9, 302.1, 302.6, 292, 293.3, 298, 299

(56) References Cited

U.S. PATENT DOCUMENTS

| | | | |
|---|---|---|---|
| 4,136,500 | * | 1/1979 | DiFiore ........................ 52/169.5 X |
| 5,080,004 | * | 1/1992 | Francis et al. .................. 52/169.5 X |
| 5,083,500 | * | 1/1992 | Francis et al. .................. 52/169.5 X |
| 5,101,712 | * | 4/1992 | Dean, Jr. ....................... 52/169.5 X |
| 5,560,163 | * | 10/1996 | Carlton ............................. 52/169.5 |
| 5,852,906 | * | 12/1998 | Kuban .......................... 52/169.5 X |
| 5,882,508 | * | 3/1999 | St-Jacques .................... 52/169.5 X |
| 5,884,439 | * | 3/1999 | Hess, III et al. ............... 52/169.5 X |
| 6,082,932 | * | 7/2000 | Anderson ..................... 52/169.5 X |

* cited by examiner

Primary Examiner—Jose V. Chen
Assistant Examiner—Rodney B. White
(74) Attorney, Agent, or Firm—Rader, Fishman & Grauer, PLLC

(57) ABSTRACT

A floor mold slab 3 of reinforced concrete is uniformly assembled above sleeve crowns of underground beams 12 of mat foundations 1 of reinforced concrete, and underground beam piercing pipes 43, whose length is identical to a width of the underground beam 12, both pipe ends thereof being provided with connecting portions 433 for joints, are embedded and fixed within the underground beam 12 at the time of installing concrete for the mat foundations 1, and pipes 4 that are used for guiding plumbing for water, gas or other fluids or electric wiring cables are respectively connected to both pipe ends while the pipes 4 are extended indoor and outdoor. With this arrangement, concrete closely fits to the periphery of the underground beam piercing pipes 43 so that termites can be prevented from entering an underfloor portion 5 of a building from piping portions piercing through the underground beams 12. Since operations for filling in mortar to piping portions can be omitted, construction efficiencies of foundation work and pipework can be improved.

2 Claims, 1 Drawing Sheet

TERMITE SHIELDING STRUCTURE OF UNDERGROUND BEAMS AND A METHOD FOR CONSTRUCTING THE SAME

BACKGROUND OF THE INVENTION

The present invention relates to a termite shielding structure for preventing termites from entering from underground into underfloor portions of a building, and particularly to a termite shielding structure and a method for constructing the same that is capable of preventing termite paths from being formed around piping piercing through underground beams of mat foundations in case a foundation for the building is formed of mat foundations of reinforced concrete.

In case ventilation of an underfloor portion in a building is poor, it is often the case that the building is eroded by termites. Termites favorably breed on temperate and humid soil, and by entering an underfloor portion from cracks in foundations or peripheries of underground piping, they erode buildings.

Thus, measures are usually taken in that termite shielding chemicals (repellents or insecticides) are dispersed on soil on underfloor portions of buildings to prevent termites from entering owing to their chemical efficacy. However, chemical efficacy of termite shielding chemicals vanish after a short term and when used in a large amount, these chemicals may pollute peripheral environments of the building or do harm to residents, persons performing the dispersion or any other creatures.

In case foundations of the building are mat foundations of reinforced concrete and outer peripheral portions of the building are surrounded by underground beams of these mat foundations, it is possible to prevent termites from entering at least in a range of several tens of centimeters from the ground surface by the use of these underground beams of reinforced concrete. However, in case piping for plumbing water, gas or others as well as guiding pipes for electric wiring cables that are embedded underground are arranged to pierce through underground beams, there still exists the danger that termite paths be formed in the periphery of these piping.

Thus, such problems are generally coped with by preliminarily embedding tubular sleeves into the underground beams at the time of installing concrete for the underground beams wherein these sleeves form hole portions for piping piercing through the underground beams, and after inserting piping such as steel pipes that are directly used for delivery of plumbing water or other fluids or vinyl chloride pipes that serve as guiding pipes for electric wiring cables, mortar is filled into clearances formed between inner peripheral surfaces of the hole portions and pipes for preventing the entry of termites.

However, in such a termite shielding structure, these operations of filling mortar into clearances formed between hole portions for the piping that are formed by the sleeves and pipes are troublesome and result in higher construction costs, and it was often the case that the filling of mortar into the hole portion interior was incomplete so that there was still a path left for the termites to enter.

PURPOSE AND SUMMARY OF THE INVENTION

It is a purpose of the present invention to provide a termite shielding structure for underground beams that can reliably prevent underfloor entering paths being formed by termites especially at piping portions piercing through underground beams of mat foundations formed of reinforced concrete and whose maintenance is also simple, and to provide a method for constructing the same.

For achieving these purposes, the termite shielding structure for underground beams according to the present invention is characterized in that underground beam piercing pipes constituting a part of pipes for guiding plumbing for water, gas or other fluid as well as electric wiring cables assume a length identical to a width of underground beams of a mat foundation of reinforced concrete, both ends of the underground beam piercing pipes being formed with connecting portions for joints, wherein these piercing pipes are embedded and fixed within the underground beams with both pipe ends thereof being aligned with respect to both lateral surfaces of the underground beams and wherein the piercing pipes are extended by connecting the guide pipes to the connecting portions for joints formed at both ends of the piercing pipes.

Here, underground beams of the mat foundation indicate portions of foundation beams of the mat foundation that are embedded underground and which are extended in a continuous manner between columns. At portions of the piping piercing through these underground beams, underground beam piercing pipes that are arranged to assume a length identical to a width of the underground beams are embedded and fixed to the underground beams simultaneously with installing the concrete of the underground beams so that the concrete closely fits to the periphery of the underground beam piercing pipes so that the periphery is almost completely shielded. With this arrangement, it can be prevented that termite paths be formed around piping portions piercing through the underground beams.

In this manner, the termite shielding structure for underground beams according to the present invention is capable of reliably shielding the periphery of piping portions piercing through underground beams of a mat foundation so as not to leave portions at which termite paths may be formed, and since this method does not rely on chemical efficacy of termite shielding chemicals that are dispersed into the soil or termite shielding sheets, it can be achieved for a long term and reliable protection against termites from entering.

It should be noted that connecting portions for joints that are provided at both pipe ends of underground beam piercing pipes are suitably selected from various pipe joints, depending on materials and diameters of pipes to which these joints are connected, such as connecting portions through screws, connecting portions through sleeve welding, or connecting portions through flange stud joints.

According to the constructing method for shielding termites underfloor of a building of the present invention, the method comprises the step of forming underground beam piercing pipes which constitute a part of pipes for guiding plumbing for water, gas or other fluid as well as electric wiring cables and which assume a length identical to a width of underground beams of a mat foundation of reinforced concrete, both ends of the underground beam piercing pipes being formed with connecting portions for joints, and further comprising the steps of erecting frameworks for the underground beams in which the piercing pipes are aligned in a transverse manner with respect to extending directions of the underground beams, installing concrete into the frameworks for embedding and fixing the piercing pipes within the underground beams, connecting the guide pipes to the connecting portions for joints formed at both ends of the piercing pipes after removing the frameworks from cured concrete, thereby extending the pipes towards indoor and outdoor sides of the building and raising the indoor pipes to an underfloor portion of the building, and filling back the indoor side of the underground beams up to sleeve crowns of the underground beams.

According to this invention, the above termite shielding structure for underground beams can be simply constructed through rational steps when assembling the structure of reinforced concrete. After forming underground beams by installing concrete, troublesome operations such as filling mortar into sleeves are no longer necessary and there is no fear that termite paths be formed through incompleteness of filling mortar.

DESCRIPTION OF THE PREFERRED EMBODIMENT

Figure 1:
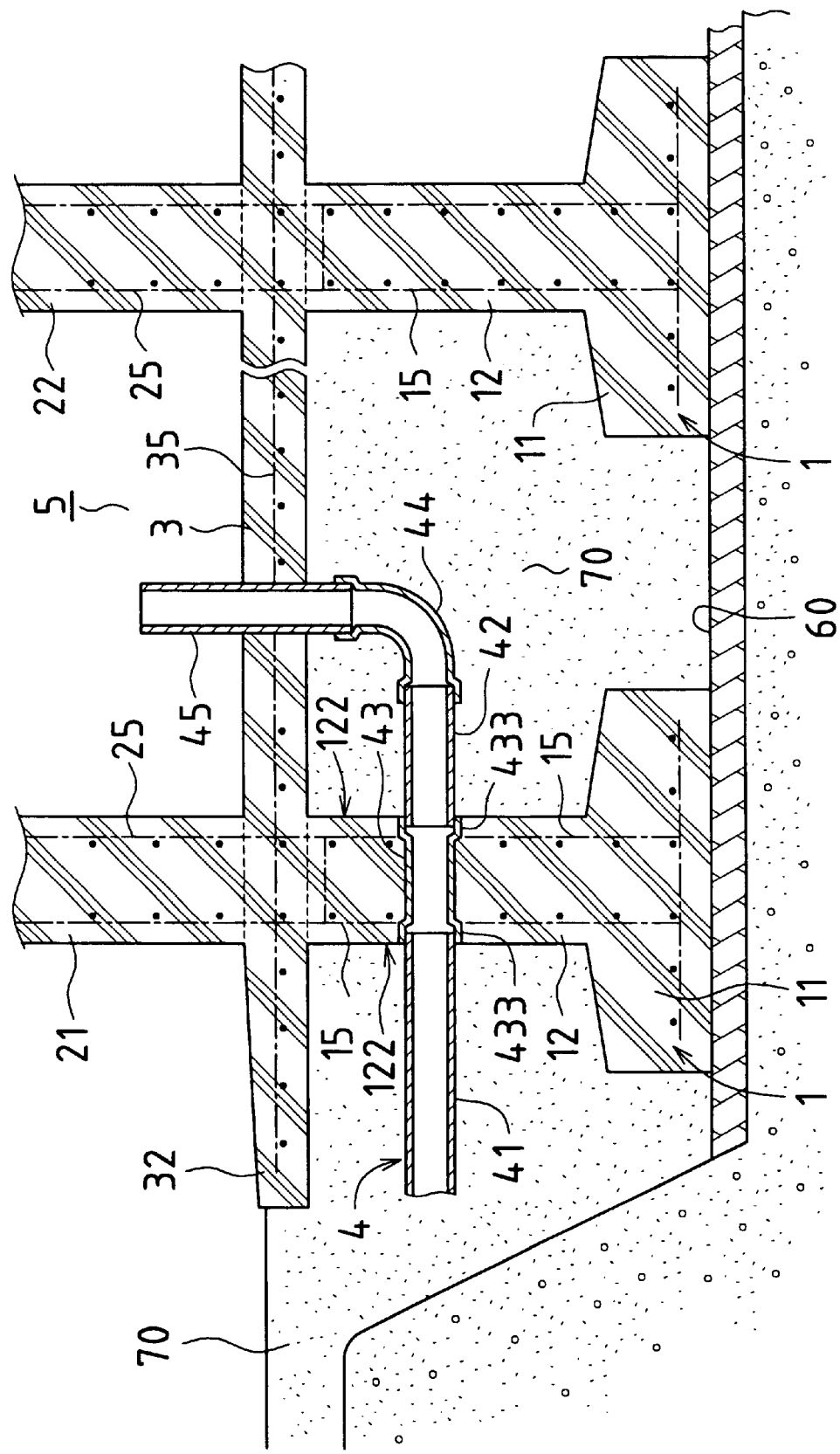
FIG. 1 is a longitudinal sectional view showing a periphery of a mat foundation and piping portions piercing through underground beams of the mat foundation according to an embodiment of the termite shielding structure for underground beams of the present invention.

A preferred embodiment of the present invention will now be explained with reference to the drawing.

FIG. 1 shows an overall structure of the termite shielding structure for underground beams according to the present invention.

Mat foundations 1 each comprised of a footing 11 and an underground beam 12 are assembled above a ground 60 that has been excavated and treated through broken stone foundation. The mat foundations 1 are assembled to extend along an outer periphery of a building in a successive manner, and are also arranged at portions in that they divide an interior of the building at suitable intervals. Above these mat foundations 1, there are established outer peripheral walls 21 and principal indoor walls 22.

The periphery of the mat foundations 1 is filled back with soil 70 up to positions of sleeve crowns of the underground beams 12, and a floor mold slab 3 of reinforced concrete is formed thereabove. The floor mold slab 3 is extended in a substantially horizontal manner to an outdoor side (left-hand side in the drawing) to form a berm 32. At positions corresponding to the underground beams 12 above the floor mold slab 3, there are erected outer peripheral walls 21 and indoor walls 22 made of reinforced concrete. Bar arrangements 15 of the underground beams 12 and bar arrangements 25 of the outer peripheral walls 12 and indoor walls 22 are connected to each other to give continuous structures. Bar arrangements 35 are also formed for the floor mold slab 3 through reinforcements or wire mesh. With these bar arrangements 35 being connected to the bar arrangements 25 of the outer peripheral walls 21 or inner walls 22, the underground beams 12, walls (outer peripheral walls 21 and indoor walls 22) and floor mold slab 3 are formed in an uniform manner.

Underground and below the floor mold slab 3, steel pipes 4 that are used, for instance, as water pipes or gas pipes, are arranged to pierce through the underground beams 12 of the mat foundations 1. These steel pipes 4 communicate between the interior and the exterior of a building by connecting straight pipes 41, 42 locating on the indoor side and outdoor side to both pipe ends of underground beam piercing pipes 43 embedded in the underground beams 12. Each of the underground beam piercing pipes 43 is formed in that a steel pipe 4 is cut to be short and in that connecting portions 433, 433 for joints are provided at both pipe ends thereof to assume a pipe length that is identical to the width of the underground beam 12, and is arranged within the underground beam 12 to be transverse with respect to the extending direction of the underground beam 12 and is embedded and fixed at the concrete of the underground beam 12 with both pipe ends aligned at both lateral surfaces 122, 122 of the underground beam 12. The connecting portion 433 is formed of a threaded (not shown in the drawing) socket made of steel.

An elbow pipe 44 is connected to another pipe end of the straight pipe 42 that extends to the indoor side, and a floor mold piercing pipe 45 is formed by connecting to the elbow pipe 44 another straight pipe that rises upward. The floor mold piercing pipe 45 pierces through the floor mold slab 3 in a vertical manner such that an upper pipe end thereof extrudes to an underfloor portion 5 above the floor mold slab 3 and may be connected to water pipes etc. (not shown) that are provided at the underfloor portion 5.

Similar steps are taken in case of arranging vinyl chloride pipes instead of steel pipes 4 that are used as guiding pipes for electric wiring cables. That is, an underground beam piercing pipe, which is a vinyl chloride pipe provided with connecting portions 433 for joints on both ends thereof, is formed to assume a length that is identical to the width of the underground beam 12, and the underground beam piercing pipe is disposed within the underground beam 12. Then, indoor and outdoor guiding pipes are connected to this underground beam piercing pipe, whereupon electric wiring cables are inserted into the interior of the guiding pipe.

The termite shielding structure for underground beams is constructed by performing the following steps.

First, a framework for the mat foundations 1 is erected onto ground 60. At suitable positions corresponding to portions of underground beams 12 of the mat foundations 1, the underground beam piercing pipes 43 are disposed so as to be transverse with respect to the extending direction of the mat foundations 1 and are attached to the bar arrangement 15 of the underground beam 12 by temporal fastening. Since the length of each of the underground beam piercing pipes 43 is identical to the width of the underground beam 12, attachment is effected with both pipe ends being closely fitted at the framework of the underground beam 12. In addition, leg portions of bar arrangements 25 of the outer peripheral walls 21 and indoor walls 22 are established on and connected to upper portions of the bar arrangement 15 of the underground beams 12.

Concrete is then installed into the framework of the mat foundations 1 and the underground beam piercing pipes 43 are embedded and fixed into the concrete. After removing the framework upon curing of the concrete, connecting portions 433 on both pipe ends of the underground beam piercing pipes 43 are open on both lateral sides of the underground beam 12 so that outdoor side and indoor side straight pipes 41, 42 may then be connected thereto. To the outdoor side straight pipe 41, an outdoor feeder pipe (not shown in the drawing) or similar maybe suitably connected. To the indoor side straight pipe 42, there are connected the elbow pipe 44 and floor mold piercing pipe 45, and the pipe end of the floor mold piercing pipe 45 is raised up to the underfloor portion 5. After the pipes being generally arranged, soil 70 is filled back into the periphery of the mat foundations 1 up to sleeve crowns of the underground beams 12.

After assembling bar arrangements 35 of the floor mold slab 3 above sleeve crown positions of the underground beams 12 and connecting these also to the bar arrangements 25 of the outer periphery walls 21 and indoor walls 22, floor mold concrete is installed. With this arrangement, the floor mold slab 3 may be formed while simultaneously surrounding a periphery of the floor mold piercing pipes 45 by the concrete.

Thereafter, frameworks for the outer periphery walls 21 and indoor walls 22 are erected to form the outer periphery walls 21 and indoor walls 22 above the floor mold slab 3. Then, respective pipes at the underfloor portion 5 (not shown) are connected to the upper pipe ends of the floor mold piercing pipes 45 and extended to respective indoor portions.

According to the termite shielding structure for underground beams of the above arrangement, the underfloor portion 5 is completely shielded from the underground by the floor mold slab 3, outer periphery walls 21 and indoor walls 22 that are uniformly formed with the mat foundations 1 of reinforced concrete. Since the underground beam piercing pipes 43 are embedded and fixed within the reinforced concrete of the underground beams 12 also at piping portions piercing through the underground beams 12 of the mat foundations 1, concrete sufficiently fits also at these piping portions. Thus, termites can be almost completely prevented from entering through peripheral portions of the piping portions unlike with conventional structures in which mortar was filled between sleeves and pipes. Also, constructing efficiencies of foundation work or pipework can be improved since troublesome operations related to filling mortar into sleeves can be omitted.

Further, since this termite shielding structure for underground beams is not dependent on chemical efficacy of termite shielding chemicals that are dispersed into soil or termite shielding sheets, long term and reliable protection against termites from entering can be achieved. Thus, economical maintenance is enabled since supplement of chemicals is not necessary, and there is no fear that peripheral environments be polluted or residents or other creatures may be harmed through chemicals.

On the other hand, according to the construction method for the termite shielding structure provided underfloor of a building, easy and speedy construction is enabled through rational steps for assembling the above termite shielding structure through reinforced concrete.

What is claimed is:

1. A termite shielding structure for underground beams comprising underground beam piercing pipes and underground beams of mat foundations, said piercing pipes constituting a part of pipes for guiding plumbing for water, gas or other fluid as well as electric wiring cables wherein said piercing pipes have a length equal to a width of underground beams of a mat foundation of reinforced concrete, both ends of the underground beam piercing pipes being formed with connecting portions for joints, wherein these piercing pipes are embedded and fixed within the underground beams with both pipe ends thereof being aligned with respect to both lateral surfaces of the underground beams and wherein the piercing pipes are extended by connecting the guide pipes to the connecting portions for joints formed at both ends of the piercing pipes.

2. A constructing method for shielding termites underfloor of a building, comprising the step of forming underground beam piercing pipes which constitute a part of pipes for guiding plumbing for water, gas or other fluid as well as electric wiring cables and which assume a length identical to a width of underground beams of a mat foundation of reinforced concrete, both ends of the underground beam piercing pipes being formed with connecting portions for joints, and further comprising the steps of erecting framework for the underground beams in which the piercing pipes are aligned in a transverse manner with respect to extending directions of the underground beams, installing concrete into the framework for embedding and fixing the piercing pipes within the underground beams, connecting the guide pipes to the connecting portions for joints formed at both ends of the piercing pipes after removing the frameworks from cured concrete, thereby extending the pipes towards indoor and outdoor sides of the building and raising the indoor pipes to an underfloor portion of the building, and filling back the indoor side of the underground beams up to sleeve crowns of the underground beams.

\* \* \* \* \*